United States Patent
Yu et al.

(10) Patent No.: US 8,064,775 B2
(45) Date of Patent: Nov. 22, 2011

(54) GENERATION OF AT LEAST 100 GBIT/S OPTICAL TRANSMISSION

(75) Inventors: Jianjun Yu, Princeton, NJ (US); Lei Xu, Kearny, NJ (US); Philip Ji, Princeton, NJ (US); Ting Wang, West Windsor, NJ (US); Dayou Qian, Plainsboro, NJ (US); Yutaka Yano, Tokyo (JP)

(73) Assignees: NEC Laboratories America, Inc., Princeton, NJ (US); NEC Corporation, Tokyo (JP)

( * ) Notice: Subject to any disclaimer, the term of this patent is extended or adjusted under 35 U.S.C. 154(b) by 662 days.

(21) Appl. No.: 12/183,368

(22) Filed: Jul. 31, 2008

(65) Prior Publication Data

US 2010/0028001 A1 Feb. 4, 2010

(51) Int. Cl.
*H04B 10/04* (2006.01)
*H04B 10/12* (2006.01)

(52) U.S. Cl. ........ 398/187; 398/182; 398/183; 398/184; 398/188

(58) Field of Classification Search .................. 398/183, 398/182, 184, 185, 186, 187, 188
See application file for complete search history.

(56) References Cited

U.S. PATENT DOCUMENTS 7,577,367 B2 * 8/2009 Way .............................. 398/183
2009/0067843 A1 * 3/2009 Way et al. ....................... 398/79

OTHER PUBLICATIONS

Yonenaga et al., "100 Gbit/s All-Optical OFDM Transmission Using 4X25 Gbit/s Optical Duobinary Signals with Phase-Controlled Optical Sub-Carriers", Feb. 24-28, 2008, Optical Society of America, OFC/NFOEC 2008, pp. 1-3.*

* cited by examiner

*Primary Examiner* — Kenneth N Vanderpuye
*Assistant Examiner* — Daniel Dobson
(74) *Attorney, Agent, or Firm* — Joseph Kolodka

(57) ABSTRACT

A method includes generating at least two lightwave carriers from a lightwave source, the carriers having a wavelength spacing, creating an up-subchannel and a down-subchannel orthogonal to one another and spaced apart based on the fixed wavelength spacing from modulations of the lightwave carriers according to respective up-converted OFDM signals that are carrier suppressed, and combining one lightwave from the up-subchannel and one lightwave from the down-subchannel into an optical channel for transmission over an optical fiber.

7 Claims, 3 Drawing Sheets

GENERATION OF AT LEAST 100 GBIT/S OPTICAL TRANSMISSION

BACKGROUND OF THE INVENTION

With the rapid growth of data-centric services, carrier providers are looking for implementing 100 Gbit/s Ethernet in the MAN or access network. The 100 Gbit/s or higher Ethernet architectures based on wavelength multiplexing for metro networks have been proposed, and an ETDM transmitter has been demonstrated recently for this system. However, the transmission of 100 Gbit/s signals per channel over wide-area network (~100 km) will result in strong penalties from residual chromatic dispersion (CD) and polarization mode dispersion (PMD), even after practical optical impairment compensation. Moreover the total dispersion of the transmission system can be changed when the Ethernet signals are transmitted from one building to another building with different distance. For the new fiber with a length of 100 km and PMD coefficient of 0.1 $ps/km^{1/2}$, the average PMD is about 1 ps and for the same transmission distances, older fibers with PMD coefficient up to 1 $ps/km^{1/2}$ results average PMD of 10 ps. Moreover, some optical components such as optical couplers, optical multiplexers/demultiplexers may have large PMD. Therefore, it is important for 100 Gbit/s signals to have large CD and PMD tolerance.

Recently, orthogonal frequency division multiplexing (OFDM) modulation format has been proposed for optical communication system to improve the dispersion and PMD tolerance. This technology can simultaneously transmit signal in multiple sub-channels within a limited bandwidth. Therefore OFDM is high spectrum efficiency due to orthogonality between adjacent sub-channels, and the modulated signals can tolerate large fiber dispersion and PMD due to narrow spectral width of individual sub-channels.

The current method to generate OFDM signal for optical transmission is via signal processing in electrical domain. The spectrum of electrical OFDM over fiber transmission is shown in FIG. 1. Since the transmission signal for OFDM modulation is an analog signal, it requires high speed A/D and D/A converters. However, the bandwidth for the high-speed electronic devices required for electrical OFDM signal generation (such as A/D converter and D/A converter) is still limited currently. As a result, real time 100 Gbit/s OFDM transmission cannot be achieved physically by the commercial A/D or D/A.

Accordingly, there is need for a method for generating an optical channel of 100 Gbit/s or greater bandwidth with high spectral efficiency and dispersion tolerance.

SUMMARY OF THE INVENTION

In accordance with the invention, a method includes generating at least two lightwave carriers from a lightwave source, the carriers having a wavelength spacing, creating an up-subchannel and a down-subchannel orthogonal to one another and spaced apart based on the wavelength spacing from modulations of the lightwave carriers according to respective up-converted OFDM signals that are carrier suppressed, and combining one lightwave from the up-subchannel and one lightwave from the down-subchannel into an optical channel for transmission over an optical fiber.

In another aspect of the invention, a method includes combining one lightwave from an up-subchannel and one lightwave from a down-subchannel into an optical channel for transmission over an optical fiber, the up-subchannel and down-subchannel being orthogonal to one another and spaced apart based on a wavelength spacing and created from modulations of lightwave carriers from a lightwave source varied according to respective up-converted OFDM signals that are carrier suppressed.

BRIEF DESCRIPTION OF DRAWINGS

These and other advantages of the invention will be apparent to those of ordinary skill in the art by reference to the following detailed description and the accompanying drawings with use of the following abbreviations IL: interleaver, OF: optical filter, TOF: tunable optical filter, EA: electrical amplifier, OC: optical coupler.

DETAILED DESCRIPTION

The invention is directed to using multiple orthogonal optical sub-channels (optical OFDM) to carry an electrical OFDM signal in which the bandwidth of the electrical OFDM at each optical sub-channel is reduced to 1/n where n is the number of optical sub-channels. This enables the generation of OFDM signal at 100 Gbit/s or higher, while still maintaining the benefit of OFDM such as high spectral efficiency, and large tolerance for PMD tolerance and group velocity dispersion.

Figure 1:
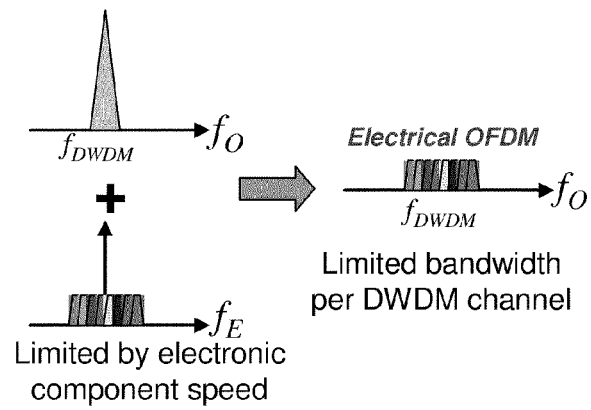
FIG. 1 is a diagram illustrating spectrum of electrical OFDM over fiber transmission.
Figure 2:
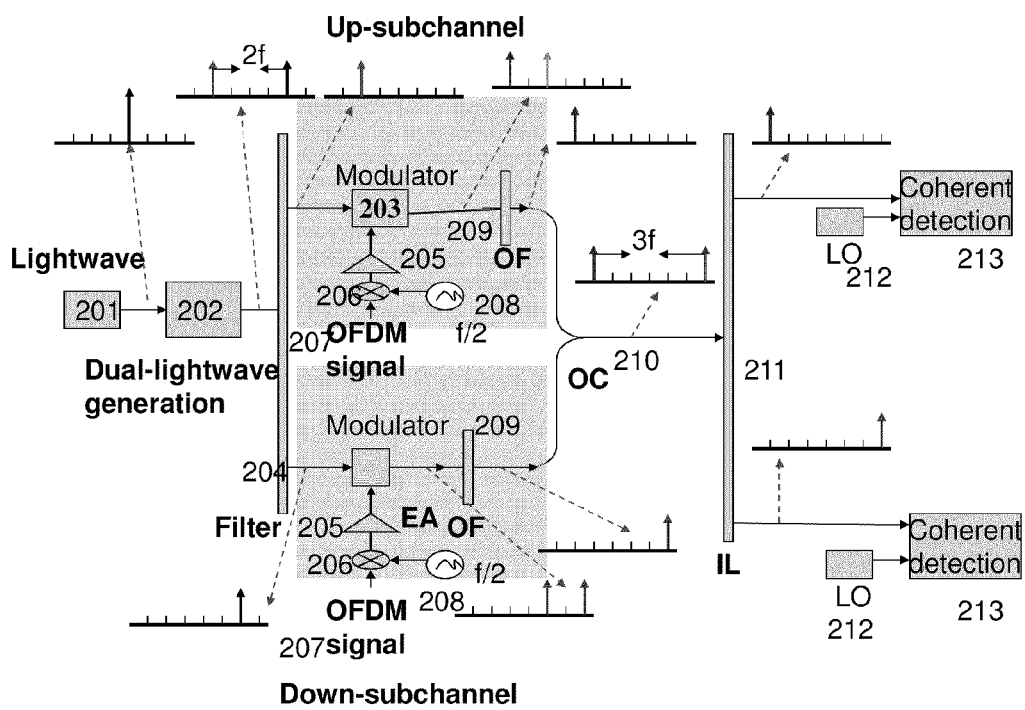
FIG. 2 is a diagram of an exemplary high speed optical transmission in accordance with the invention.
Figure 3:
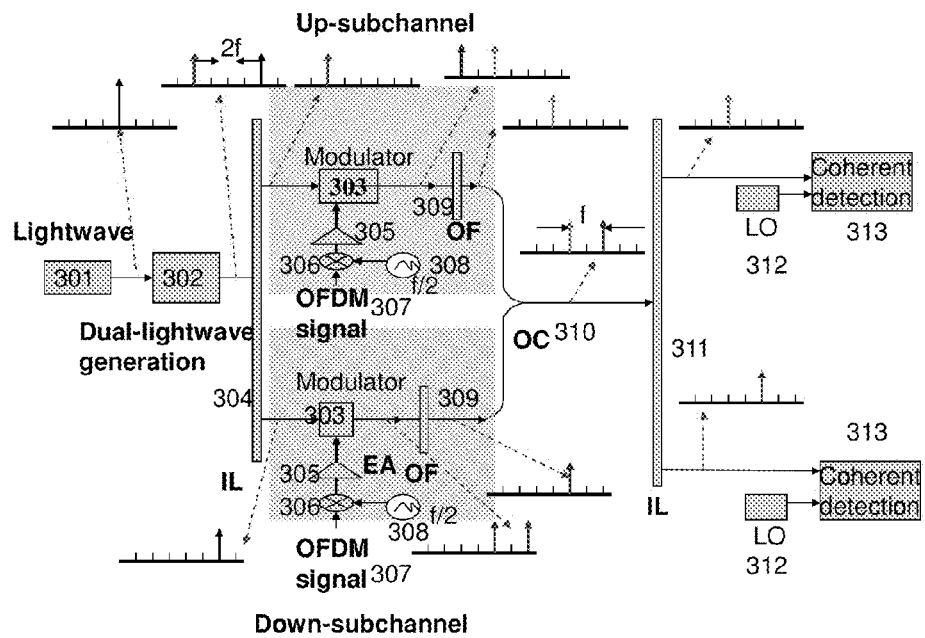
FIG. 3 is a diagram of an alternative exemplary embodiment of high speed optical transmission in accordance with the invention.
Figure 4:
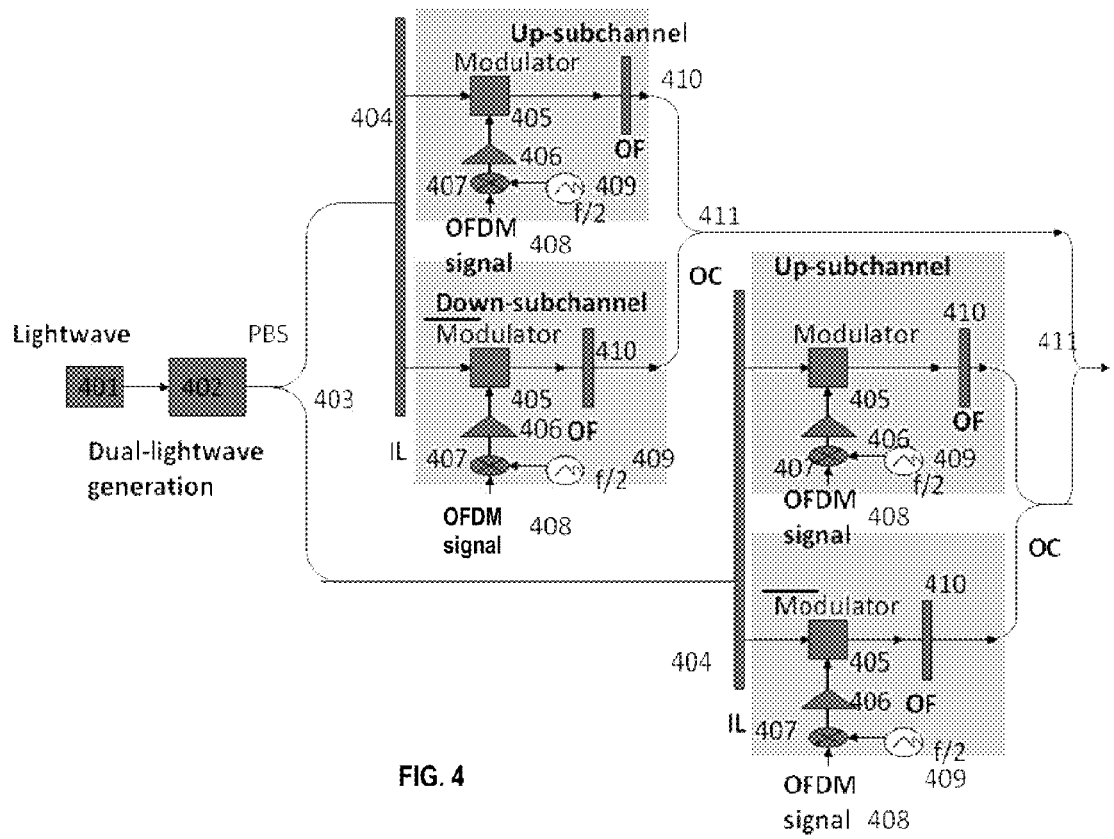
FIG. 4 a diagram of a further alternative exemplary embodiment of high speed optical transmission in accordance with the invention.
Figure 5:
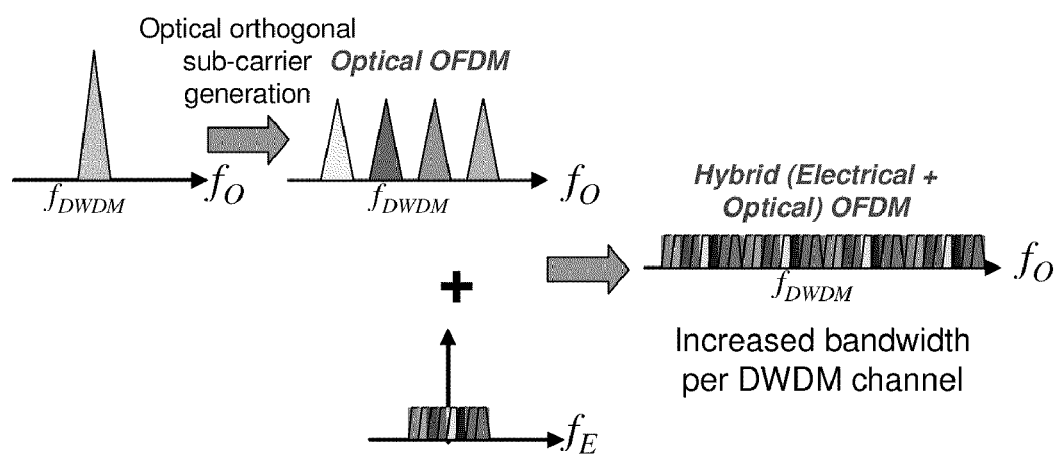
FIG. 5 is a diagram illustrating spectrum of high speed optical transmission in accordance with the invention, for comparison to the illustrated spectrum of FIG. 1.

FIGS. 2, 3 and 4 show various embodiments of a high speed optical transmission system including transmitter and detector using optical and electrical OFDM modulation, i.e., hybrid OFDM modulation. The embodiments of FIG. 2 and FIG. 3 are examples of two optical sub-channels and the embodiment of FIG. 4 employs polarization multiplexing in the transmitter in order to increase spectral efficiency. The exemplary two optical sub-channels illustrated in FIG. 2, FIG. 3 can be extended to a higher number of optical sub-channels as shown in FIG. 4.

The lightwave source 201, 301, 401 preferably has a narrow line width that is less than 2 Megahertz. The multiple lightwave generation 202, 302, 402 includes optical carrier suppression and external modulation entailing phase modulation or cascaded phase modulation and intensity modulation. The optical filter 204, 304, 404, 209, 309, 410 can be an optical interleaver, tunable optical filter, wave division multiplexing WDM filter or an array wave grating filter. The electrical amplifier 205, 305 405 provides gain to drive an external modulator. The electrical mixer 206, 306, 407 upconverts the baseband OFDM signal to a high frequency band. The OFDM signal 207, 307, 308 has high spectral efficiency, large tolerance for polarization mode dispersion and group velocity dispersion. The RF signal 208, 308, 409 provides and RF source to realize the upconversion.

Referring now to the FIGS. 2, 3 and 4, up to 100 Gbit/s signals are carried by two 50 Gbit/s OFDM signal with certain channel spacing. For high-speed and long distance transmission of OFDM signals, the lightwave to carry the OFDM signal should be narrow line width laser (usually smaller than 100 kHz), and in the receiver, it will use regular coherent detection scheme for OFDM signal detection. In the invention, we only need one high-stable and narrow line-width laser source for the two OFDM sub-channels. The reason is that the lightwave carriers for the two sub-channels are obtained from the same lightwave source 201, 301, 401 using multi-wavelength generation 202, 302, 402 techniques. Therefore, the generated light-waves are as stable and narrow as the original source.

We use optical carrier suppression or phase modulation 203, 303, 405 to generate two- or multi-wavelengths with fixed wavelength spacing. Due to the generation mechanism, these sub-channels are orthogonal to one another. We assume the generated two peaks or modes have a frequency spacing of 2f. After properly optical filtering 204, 304, 404 we can get two separated light-waves with stable wavelength, narrow linewidth and fixed wavelength spacing. We assume that the two 50 Gbit/s or higher OFDM signals 207, 307, 408 are up-converted to a f/2 frequency 208 or 308 by using an electrical mixer 206, 306, 407.

The up-converted OFDM electrical signals drive an intensity external modulator 203, 303, 405 after being amplified by an electrical amplifier 205, 305, 406 and the external modulator is DC-biased at the null-point to generate carrier suppression. The spectrum for the up-subchannel and down-subchannel after the external modulator is shown in FIG. 2 and FIG. 3. Then we use one optical filter 209, 309, 410 to get one lightwave for each subchannel before they are combined by using an optical coupler 210, 310, 411.

In this way, a 100 Gbit/s or higher Ethernet signal can be generated. The channel spacing between the two subchannels is 3f. In order to generate the two subchannels with tight frequency spacing, we can use the filtering scheme as shown in FIG. 3. Here, the frequency spacing of the two subchannels is only f. An optical filter or interleaver 209, 309, 410 can be used to reduce the linear crosstalk between the up- and down-sub-channel before they are combined by a 3 dB optical coupler. In the receiver, the two subchannels are separated by using optical filter 211, 311 before they are detected by using coherent receiver 213, 313. The coherent receiver is a regular scheme. A local oscillator (LO) 212, 312 is used to realize coherent detection. In order to realize polarization insensitive detection, the coherent receiver should be a polarization diversity detection scheme.

In order to increase the spectral efficiency, we can use polarization multiplexing in the transmitter. The transmitter configuration for the polarization multiplexing is shown in FIG. 4. It is similar to the configuration in FIG. 2 and FIG. 3, and only two polarization orthogonal transmitters are employed. Here all fiber in the transmitter should be polarization maintaining fiber. By this scheme, for 100 Gbit/s transmitter, the OFDM electrical signal is only 25 Gbit/s. The polarization beam splitter 403 is used to split the lightwave to two orthogonal polarization signals. Then each polarization signal is modulated as described for FIG. 2 and FIG. 3. Finally, an optical coupler 411 is used to combine the two orthogonal polarization multiplexing The invention enables the implementation of high-speed (100 Gbit/s or higher per channel) OFDM-modulated signal over optical fiber. With this invention, an optical communication network can have larger capacity, such as 100 Gbit/s or higher per channel with narrow channel spacing, and have better transmission performance, such as higher PMD and dispersion tolerance, which will lead to longer transmission distance.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, not explicitly shown or described herein, embody the principles of the invention and are within their spirit and scope.

What is claimed is:

1. A method comprising the steps of:
generating at least two lightwave carriers from a lightwave source, the carriers having fixed wavelength spacing;
creating an up-subchannel and a down-subchannel orthogonal to one another and spaced apart based on a wavelength spacing from modulations of the lightwave carriers according to respective up-converted OFDM signals that are carrier suppressed;
combining one lightwave from the up-subchannel and one lightwave from the down-subchannel into an optical channel for transmission over an optical fiber;
splitting the lightwave source into two orthogonal polarization signals to provide cascading of the step of creating an up-subchannel and a down-subchannel orthogonal to one another and spaced apart based on the wavelength spacing from modulations of the lightwave carriers according to respective up-converted OFDM signals that are carrier suppressed;
wherein said creating comprises each of the polarization signals being a distinct one of the lightwave source for generating a first set of two lightwave carriers and a second set of two lightwave carriers and the step of creating provides a first pair of the up-subchannel and down-subchannel corresponding to the first set of two lightwave carriers and a second pair of up-subchannel and down-subchannel corresponding to the second set of two lightwave carriers; and
wherein said combining comprises combining one lightwave from the first pair of up-subchannel, one lightwave from the down-subchannel from the first pair, one lightwave from the second pair of up-subchannel, one lightwave from the down-subchannel from the second pair into an optical channel for transmission over an optical fiber.

2. The method of claim 1, wherein the wavelength spacing is 2f and the up-subchannel and the down-subchannel are spaced apart f.

3. The method of claim 1, wherein the wavelength spacing is 2f and the up-subchannel and the down-subchannel are spaced apart 3f.

4. The method of claim 1, wherein the OFDM signals are each at least 50 Gbit/s signals and the optical channel from combining the up-subchannel and down-subchannel is at least 100 Gbit/s.

5. The method of claim 1, wherein the step of combining comprises optically filtering out the one lightwave from optical spectrums of the modulations of the lightwave carriers according to respective up-converted OFDM signals.

6. The method of claim 1, wherein the up-converted OFDM signals are carrier suppressed by the up-converted OFDM signals driving an intensity external modulator that is biased at the null point generate carrier suppression.

7. The method of claim 1, wherein the up-converted OFDM signals comprise the OFDM signals being upconverted by an electrical mixer to a frequency related to half the wavelength spacing.

* * * * *